US012011086B2

(12) United States Patent
Zacharenko

(10) Patent No.: US 12,011,086 B2
(45) Date of Patent: Jun. 18, 2024

(54) MECHANICAL CONNECTION ARRANGEMENT FOR PANELS

(71) Applicant: Välinge Innovation AB, Viken (SE)

(72) Inventor: Mindaugas Zacharenko, Viken (SE)

(73) Assignee: Välinge Innovation AB, Viken (SE)

( * ) Notice: Subject to any disclaimer, the term of this patent is extended or adjusted under 35 U.S.C. 154(b) by 0 days.

(21) Appl. No.: 17/959,010

(22) Filed: Oct. 3, 2022

(65) Prior Publication Data

US 2023/0105946 A1     Apr. 6, 2023

(30) Foreign Application Priority Data

Oct. 4, 2021   (SE) .................................... 2151215-7

(51) Int. Cl.
*A47B 47/04* (2006.01)
*A47B 47/00* (2006.01)
(Continued)

(52) U.S. Cl.
CPC ........ *A47B 47/042* (2013.01); *A47B 47/0075* (2013.01); *F16B 12/24* (2013.01); *F16B 12/26* (2013.01)

(58) Field of Classification Search
CPC .............. A47B 47/0075; A47B 47/042; A47B 2230/0096; A47B 2230/0081;
(Continued)

(56) References Cited

U.S. PATENT DOCUMENTS 1,954,242 A * 4/1934 Heppenstall ......... A47B 47/042
                                                    403/381
11,680,595 B2 * 6/2023 Derelöv .................... F16B 9/09
                                                    312/228
(Continued)

FOREIGN PATENT DOCUMENTS

WO    2015/105449 A1    7/2015
WO    2018/194509 A1    10/2018
WO    2020/046193 A1    3/2020

OTHER PUBLICATIONS

U.S. Appl. No. 18/422,368, Christian Boo, filed Jan. 25, 2024.
(Continued)

*Primary Examiner* — Kimberley S Wright
(74) *Attorney, Agent, or Firm* — Boone IP Law

(57) ABSTRACT

A connection arrangement for panels including a first panel having a first main plane and a second panel having a second main plane. The first main plane is essentially perpendicular to the second main plane in a connected state. The second panel includes a groove on a first face adapted to receive a first edge of the first panel. The connection arrangement includes an elongate flexible tongue element arranged in an elongate insertion groove in the first panel at an angle of less than 45° relative the first main plane and arranged to cooperate with an elongate tongue receiving groove arranged in the groove of the second panel for connecting the two panels to one another. The elongate insertion groove and the elongate flexible tongue element are configured to extend through the plane of the first face of the second panel when the two panels are in a connected state.

22 Claims, 5 Drawing Sheets

(51) Int. Cl.
*F16B 12/12* (2006.01)
*F16B 12/24* (2006.01)
*F16B 12/26* (2006.01)
*F16B 12/46* (2006.01)

(58) Field of Classification Search
CPC ... A47B 96/201; A47B 47/0066; F16B 12/24; F16B 12/26; F16B 12/125
See application file for complete search history.

(56) References Cited

U.S. PATENT DOCUMENTS

| | | | | |
|---|---|---|---|---|
| 2008/0110125 A1* | 5/2008 | Pervan | ................... | E04F 15/04 52/582.2 |
| 2009/0151291 A1* | 6/2009 | Pervan | ................ | E04F 13/0801 52/592.1 |
| 2011/0280655 A1* | 11/2011 | Maertens | ................ | E04F 13/10 403/375 |
| 2012/0240506 A1* | 9/2012 | Zhu | ........................ | E04F 15/02 52/588.1 |
| 2012/0279161 A1* | 11/2012 | Hakansson | .......... | A47B 47/042 52/588.1 |
| 2014/0026513 A1* | 1/2014 | Bishop | .............. | E04F 15/02016 52/745.05 |
| 2015/0078807 A1* | 3/2015 | Brannstrom | ............ | F16B 12/44 403/219 |
| 2015/0078819 A1* | 3/2015 | Derelov | ................ | A47B 47/042 403/375 |
| 2015/0196118 A1* | 7/2015 | Derelov | ................ | F16B 5/0614 403/376 |
| 2016/0000220 A1* | 1/2016 | Devos | ..................... | F16B 12/46 403/363 |
| 2016/0201336 A1* | 7/2016 | Pervan | ............. | E04F 15/02038 52/582.2 |
| 2017/0079433 A1* | 3/2017 | Derelov | .................. | F16B 12/44 |
| 2017/0089379 A1* | 3/2017 | Pervan | .................. | A47B 63/00 |
| 2017/0159291 A1* | 6/2017 | Derelöv | ................. | A47B 47/04 |
| 2017/0227035 A1* | 8/2017 | Fridlund | ................ | F16B 12/46 |
| 2019/0269240 A1* | 9/2019 | Bobillier | ................ | F16B 12/24 |
| 2021/0285480 A1* | 9/2021 | Derelöv | ................ | F16B 12/46 |

OTHER PUBLICATIONS

U.S. Appl. No. 18/422,425, Christian Boo, filed Jan. 25, 2024.
International Search Report and Written Opinion received for PCT Patent Application No. PCT/SE2022/050883, dated Nov. 8, 2022, 13 pages.
Office Action received for Swedish Patent Application No. 2151215.7, dated May 30, 2022, 8 pages.
U.S. Appl. No. 18/440,330, Thomas Meuer, filed Feb. 13, 2024.
U.S. Appl. No. 18/441,480, Peter Derelöv, filed Feb. 14, 2024.

* cited by examiner

MECHANICAL CONNECTION ARRANGEMENT FOR PANELS

CROSS REFERENCE TO RELATED APPLICATIONS

The present application claims the benefit of Swedish Application No. 2151215-7, filed on Oct. 4, 2021. The entire contents of Swedish Application No. 2151215-7 are hereby incorporated herein by reference in their entirety.

TECHNICAL FIELD

The present application concerns a connection arrangement for panels, comprising a first panel having a first main plane and a second panel having a second main plane. The first main plane is essentially perpendicular to the second main plane in a connected state. The second panel comprises a groove on a first face adapted to receive a first edge of the first panel. The connection arrangement further comprises an elongate flexible tongue element arranged in an elongate insertion groove in the first panel at an angle relative the first main plane and arranged to cooperate with an elongate tongue receiving groove arranged in said groove of the second panel for connecting the two panels to one another. The elongate insertion groove has a bottom surface towards which the flexible tongue element is arranged to be compressed during connection of the two panels.

BACKGROUND

Assembling two or more objects into one piece, for instance, furniture, has historically required tools such as drills, screwdrivers, hammers, and wrenches.

Starting with click floors, assembling not requiring tools has further been developed and many types of furniture in a household could be assembled without tools or at least with a minimum of tools.

WO 2020/046193 discloses a set including a first panel, a second panel and a mechanical locking device for locking the first panel to the second panel. The first panel includes a first edge surface, and the second panel includes a second panel surfaced. The mechanical locking device includes at least one rod-shaped element that extends at a first angle from the first edge surface. An insertion groove extends into the second panel surface at a second angle from the second panel surface. The mechanical locking device further includes at least one locking groove and at least one locking part. The locking groove includes at least one locking surface extending at a third angled from the first edge surface or from the second panel surface. The locking part is configured to be inserted into the locking groove and lock against the locking surface. The third angle is different than the first angle.

WO 2020/046194 discloses a set including a first panel, a second panel and a mechanical locking device for locking the first panel to the second panel. The first panel includes a first edge surface, and the second panel includes a second panel surface. The mechanical locking device includes at least one rod-shaped element at the first edge surface and at least one insertion groove at the second panel surface. The rod-shaped element is configured to be inserted into the insertion groove. Said set is also comprising a back panel configured to be inserted in and to cooperate with at least one of the first and second panel grooves and at least one locking gear configured to cooperate with the back panel and the first and/or second panel groove, for locking of the first panel to the second panel.

WO 2015/105449 discloses a set of panels including a first panel having a first main plain. The panels are provided with a mechanical locking device for locking a first edge of the first panel to a second edge of the second panel. The mechanical locking device includes an edge section groove at the first edge, wherein an edge section of the second edge is insertable into the edge section groove. A flexible tongue is arranged in an insertion groove provided in the edge section groove and cooperates with a tongue groove provided at the edge section of the second panel. A first thickness of a core material between the edge section groove and the outermost surface of the first edge is greater than a minimum second thickness of a core material of the edge section of the second panel.

SUMMARY

Accordingly, embodiments of the present disclosure preferably seek to further provide alternative mounting solutions that require a minimum of tools and that facilitate having a tight fit between two panels by providing a connection arrangement for panels according to the present disclosure.

An aspect of the present disclosure is a connection arrangement for panels which comprises a first panel having a first main plane and a second panel having a second main plane. The first main plane is essentially perpendicular to the second main plane in a connected state. The second panel comprises a groove on a first face adapted to receive a first edge of the first panel. The connection arrangement further comprises an elongate flexible tongue element arranged in an elongate insertion groove in the first panel at an angle relative the first main plane and arranged to cooperate with an elongate tongue receiving groove arranged in said groove of the second panel for connecting the two panels to one another. The elongate insertion groove has a bottom surface towards which the flexible tongue element is arranged to be compressed during connection of the two panels. The elongate insertion groove in the first panel together with the elongate flexible tongue element at said edge of the first panel are configured to extend through the plane of the first face of the second panel when the two panels are in a connected state.

The concept of having the flexible tongue element extending through the plane of the first face of the second panel has shown to improve the strength of the connection compared to known solutions.

According to another aspect of the present disclosure, the elongate tongue receiving groove is arranged adjacent an edge of said groove on the first face of the second panel.

This has also shown to improve the strength of the connection arrangement.

According to a further aspect of the present disclosure, the edge of the first panel has an elongate tongue, and the groove of the second panel is adapted to receive said elongate tongue.

An advantage is that the groove of the second panel can be concealed allowing for some slight variations in measure of the groove and the tongue.

Further, according to one aspect of the present disclosure the first panel is horizontally arranged, and the second panel vertically arranged, wherein the elongate tongue receiving groove is arranged on the lower side of the groove in the second panel.

This has shown to further improve the strength of the connection.

According to yet an aspect of the present disclosure, the elongate tongue receiving groove is arranged at an angle that is less than the angle of the elongate insertion groove relative said first main plane.

The function of this difference in angle improves the fit of the connection arrangement in a similar way as a wedge and also allows for some variations in production.

According to another aspect of the present disclosure, the elongate insertion groove is arranged at an angle relative said first main plane, wherein the angle is in a range of about 10° to about 45°.

According to another aspect of the present disclosure, the elongate insertion groove is arranged at an angle of less than 45° relative said first main plane.

This has also shown to improve the strength of the connection arrangement.

According to yet another aspect of the present disclosure, the elongate insertion groove is arranged at an angle of 30°+/10° relative said first main plane.

According to yet a further aspect of the present disclosure, the first panel comprises a core comprising fibres arranged essentially parallel to the first main plane.

This has shown to be advantageous from a strength point of view.

According to yet an aspect of the present disclosure, the panels each have a surface layer that is harder than their cores. The hardness may be measured by a Brinell test according to ASTM E10-18 or a Janka hardness test according to ASTM D143-21.

According to an aspect of the present disclosure, the elongate flexible tongue element is made of a material that is harder than the panel material. The hardness may be measured by a Shore hardness test.

This has shown to improve the connection arrangement.

The first panel may be a shelf, and the second panel may be an upright panel.

In other words, the first panel is arranged to carry a weight put on top of the panel.

An alternative aspect of the present disclosure is a connection arrangement for panels which comprises a first panel having a first main plane and a second panel having a second main plane. The first main plane is essentially perpendicular to the second main plane in a connected state, wherein the second panel comprises a groove on a first face adapted to receive a first edge of the first panel. The connection arrangement further comprises an elongate flexible tongue element arranged in an elongate insertion groove in the first panel at an angle relative the first main plane and arranged to cooperate with an elongate tongue receiving groove arranged in said groove of the second panel for connecting the two panels to one another. The elongate insertion groove has a bottom surface towards which the flexible tongue element is arranged to be compressed during connection of the two panels.

According to an aspect of the present disclosure, the elongate insertion groove is arranged at an angle relative said first main plane, wherein the angle is in a range of about 10° to about 45°, such as at an angle of 30°+/−10°.

According to an aspect of the present disclosure, the elongate insertion groove is arranged at an angle of less than 45° relative said first main plane.

According to one aspect of the present disclosure, the edge of the first panel has an elongate tongue, and the groove of the second panel is adapted to receive said tongue.

An advantage is that the groove of the second panel can be concealed allowing for some slight variations in measure of the groove and the tongue. A difference of a thickness of the tongue and the width of the groove may be in the range of about 0 mm to about 0.4, such as a range of about 0.1 to about 0.2 mm.

According to yet an aspect of the present disclosure, the elongate insertion groove in the first panel together with the elongate flexible tongue element at said edge of the first panel are configured to extend through the plane of the first face of the second panel when the two panels are in a connected state.

The concept of having the flexible tongue element extending through the plane of the first face of the second panel has shown to improve the strength of the connection compared to known solutions.

According to a further aspect of the present disclosure, the elongate tongue receiving groove is arranged adjacent an edge of said groove on the first face of the second panel.

This has shown to improve the strength of the connection arrangement further.

According to yet a further aspect of the present disclosure, the first panel is to be horizontally arranged and the second panel vertically arranged, wherein the elongate tongue receiving groove is arranged on the lower side of the groove in the second panel.

Arranging the elongate tongue receiving groove on the lower side has shown to be improving the strength of the connection arrangement.

According to yet another aspect of the present disclosure, the elongate tongue receiving groove is arranged at an angle that is less than the angle of the elongate insertion groove relative said first main plane. For example, the angle of the elongate tongue receiving groove may be 5° to 20°, such as 7° to 15° less than the angle of the elongate insertion groove relative said first main plane.

By arranging the elongate tongue receiving groove at a different angle, the connection arrangement comes to a closer fit in the connected state, the different angles producing a similar effect to that of a wedge.

According to yet a further aspect of the present disclosure, the first panel comprises a core comprising fibres arranged essentially parallel to the first main plane.

This has shown to further improve the strength of the connection arrangement.

According to one further aspect of the present disclosure the panels have a surface layer that is harder than their cores for further increasing the strength of the connection arrangement but also the panels themselves. The hardness may be measured by a Brinell test according to ASTM E10-18 or a Janka hardness test according to ASTM D143-21.

This has shown to improve the strength of the connection arrangement.

According to another aspect of the present disclosure, the first panel is a shelf, and the second panel is an upright panel for maximizing the strength of the connection arrangement.

A second aspect of the present disclosure is a furniture product, such as a bookshelf or cabinet, comprising the connection arrangement for panels according to any of the above aspects.

In the context of this disclosure, a panel is a flat piece of construction material made to form a part of a surface or a complete surface. Generally, panels used for furniture are rectangular such that they have two opposing flat surface sides and four edge surfaces that are parallel in pairs.

It should be emphasized that the term "comprises/comprising" when used in this specification is taken to specify the presence of stated features, integers, steps, or components but does not preclude the presence or addition of one or more other features, integers, steps, components, or groups thereof.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

These and other aspects, features, and advantages of which embodiments of the disclosure are capable of will be apparent and elucidated from the following description of embodiments of the present disclosure, reference being made to the accompanying drawings, in which.

DETAILED DESCRIPTION

Figure 1:
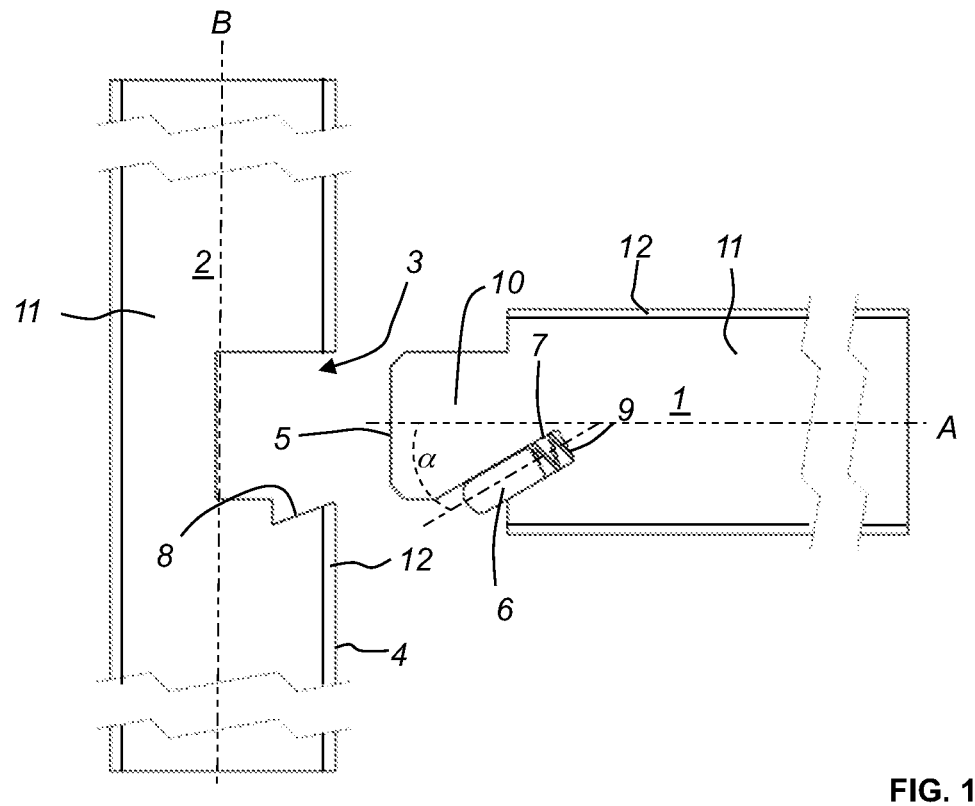
FIG. 1 is a side view of a connection arrangement in a non-connected state according to the present disclosure.

Specific embodiments of the disclosure now will be described with reference to the accompanying drawings. This subject matter may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings and in the description, like numbers refer to like elements.

Figure 2:
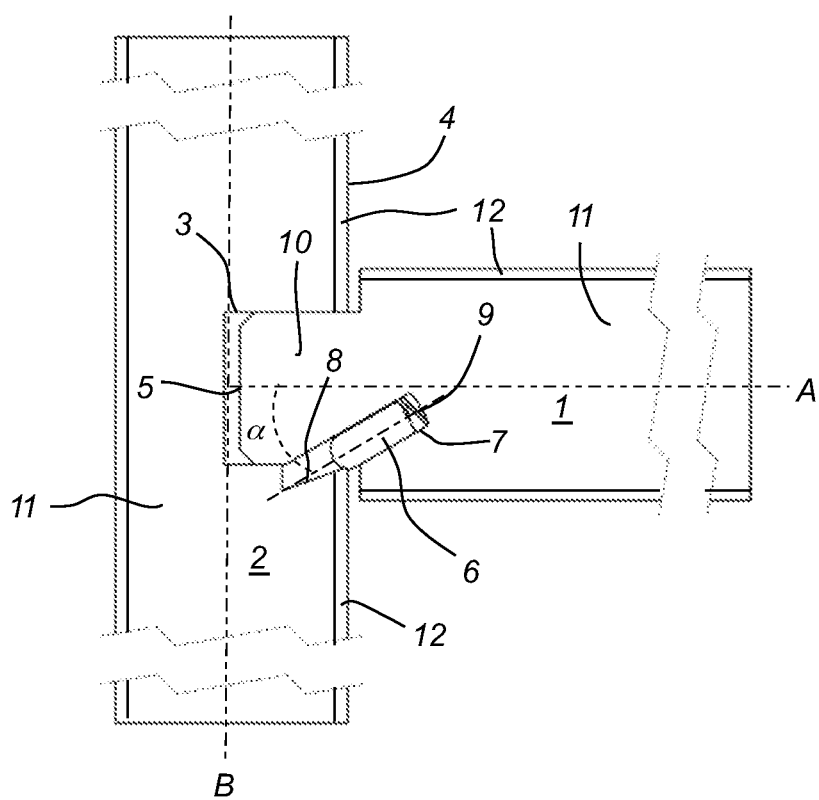
FIG. 2 is a side view of a connection arrangement in a not fully connected state according to the present disclosure.
Figure 3:
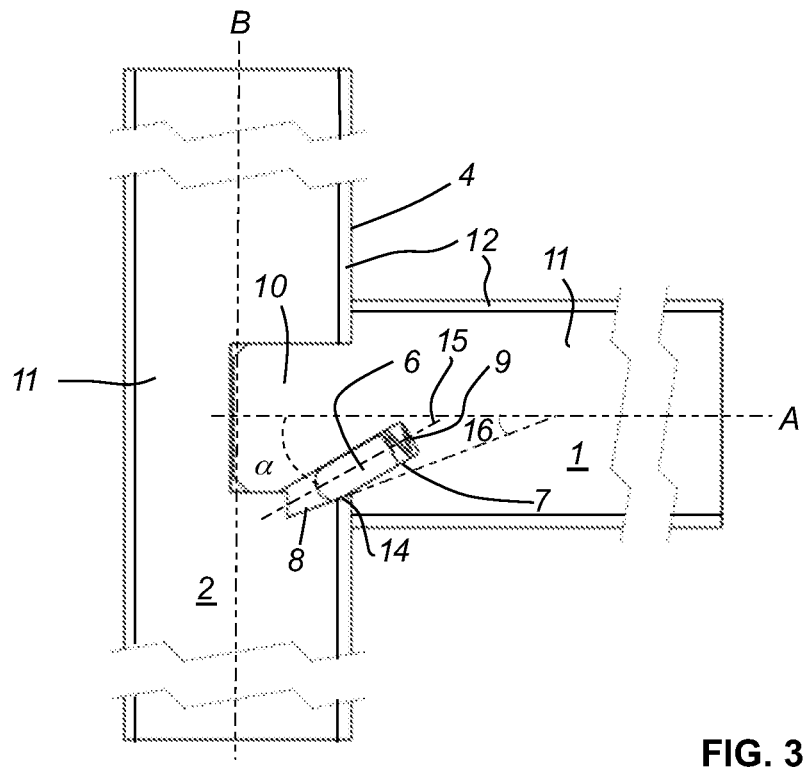
FIG. 3 is a side view of a connection arrangement in connected state according to the present disclosure.

FIGS. 1-3 show a connection arrangement for panels, comprising a first panel 1 having a first main plane A, a shelf, and a second panel 2 having a second main plane B, an upright panel. FIG. 1 shows the panels before they are connected, FIG. 2 when the panels are close to being fully connected, and finally FIG. 3 shows the two panels 1, 2 fully connected and locked to one another.

The first main plane A is essentially perpendicular to the second main plane B in the fully connected state. The second panel 2 comprises a groove 3 on a first face 4 adapted to receive a first edge 5 of the first panel 1.

The connection arrangement further comprises an elongate flexible tongue element 6 arranged in an elongate insertion groove 7 in the first panel 1 at an angle α relative the first main plane A and arranged to cooperate with an elongate tongue receiving groove 8 arranged in said groove 3 of the second panel 2 for connecting the two panels 1, 2 to one another.

The elongate insertion groove 7 has a bottom surface 9 towards which the flexible tongue element 6 is arranged to be compressed during connection of the two panels 1, 2 as can be seen in FIG. 2. The flexible tongue element 6 is pushed by the second panel 2 towards the bottom surface 9 until the first edge 5 of the first panel 1 has reached its final position in the groove 3 of the second panel, see FIG. 3. In FIG. 3, the flexible tongue element 6 has pushed back into a position that prevents the first panel 1 from being retracted from the second panel 2. That is, the flexible tongue element 6 contacts a locking surface 14 of elongate tongue receiving groove 8 to provide a locking in the direction of the first main plane A. The flexible tongue element 6 may or may not push back to an original position, prior to connection. The position that prevents the first panel 1 from being retracted from the second panel 2 may be part way between the original position and a fully compressed position achieved during connection.

The elongate insertion groove 7 in the first panel 1 together with the elongate flexible tongue element 6 at said first edge 5 of the first panel 1 may extend through the plane of the first face 4 of the second panel 2 when the two panels 1, 2 are in a connected state, see FIG. 3.

Further, as can be seen in FIG. 3, the elongate tongue receiving groove 8 may be arranged adjacent an edge of said groove 3 on the first face 4 of the second panel 2.

In the embodiments shown in FIGS. 1-3 the first edge 5 of the first panel 1 may have an elongate tongue 10 and the groove 3 of the second panel 2 may be adapted to receive said elongate tongue 10.

Figure 4:
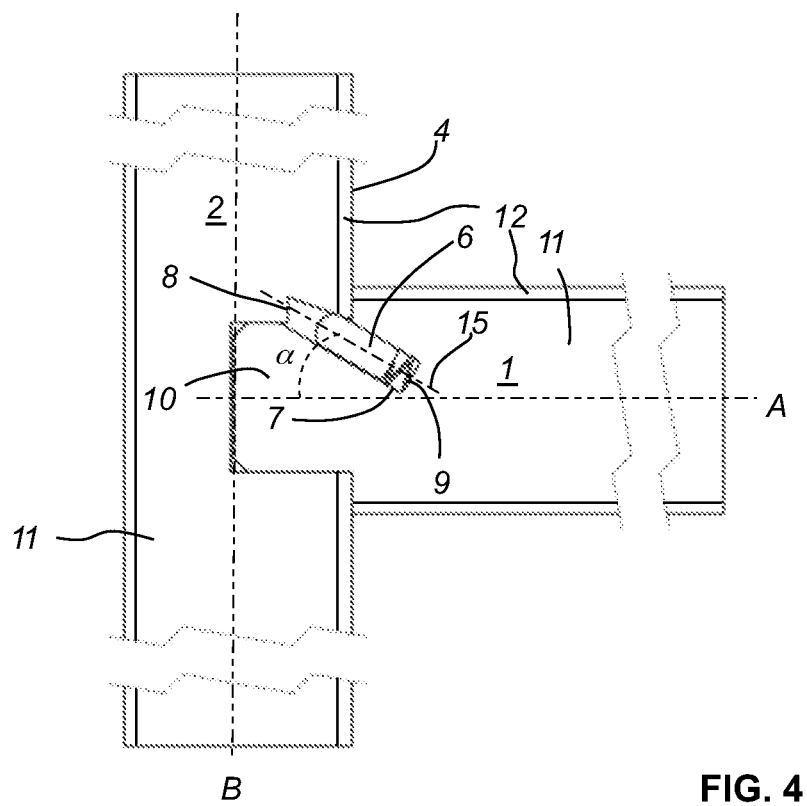
FIG. 4 is a side view of an alternative embodiment of the connection arrangement in connected state according to the present disclosure.

In FIG. 4, an alternative embodiment of the present connection arrangement is shown. Compared to the embodiment shown in FIG. 3, the embodiment in FIG. 4, a locking mechanism in the direction of the first main plane, including the flexible tongue element 6 and the elongate tongue receiving groove 8, is on the upper side of the groove 3 of the second panel 2.

In other words, when the first panel 1 is to be horizontally arranged and the second panel 2 vertically arranged, the elongate tongue receiving groove 8 is arranged on the upper side of the groove 3 in the second panel 2 in FIG. 4 and on the lower side in FIGS. 1-3.

In FIGS. 1-4 the elongate tongue receiving groove 8 is arranged at an angle that is less than the angle α of the elongate insertion groove 7 relative said first main plane A. For example, the angle of the elongate tongue receiving groove may be 5° to 20°, such as 7° to 15° less than the angle α of the elongate insertion groove relative said first main plane.

The angle 16 of the elongate tongue receiving groove may be measured between the locking surface 14 of the elongate tongue receiving groove 8 and the first main plane A.

Also, in the embodiments shown in FIGS. 1-4, the elongate insertion groove 7 may be arranged at an angle α of less than 45° relative said first main plane A.

More specifically, the elongate insertion groove 7 may be arranged at an angle α of 30°+/−10° relative said first main plane A.

The elongate insertion groove 7 may be arranged at an angle α which may be in a range of about 10° to about 45° relative said first main plane A.

The elongate insertion groove 7 may comprise a central plane 15.

The angle α may be measured between the central plane 15 and the first main plane A.

For increasing the strength of the construction using the present connection arrangement, the first panel 1 comprises a core 11 that may have fibres arranged essentially parallel to the first main plane A.

Also, the panels 1, 2 may have a surface layer 12 that is harder than their cores 11. The hardness may be measured by a Brinell test according to ASTM E10-18 or a Janka hardness test according to ASTM D143-21

Figure 5:
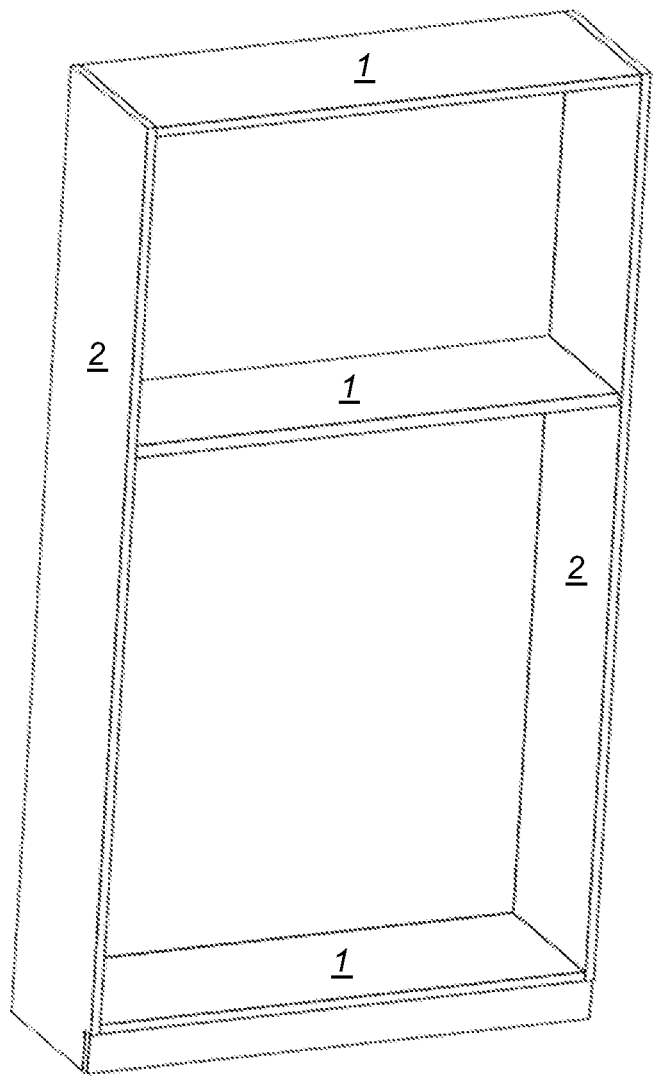
FIG. 5 is a perspective view of an example where the connection arrangement of the present disclosure is used.

To put the connection arrangement into a more easily understandable context, FIG. 5 shows a furniture product, such as a bookshelf or cabinet, wherein the first panels 1 may be shelves and the second panels 2 may be upright panels.

Figure 6:
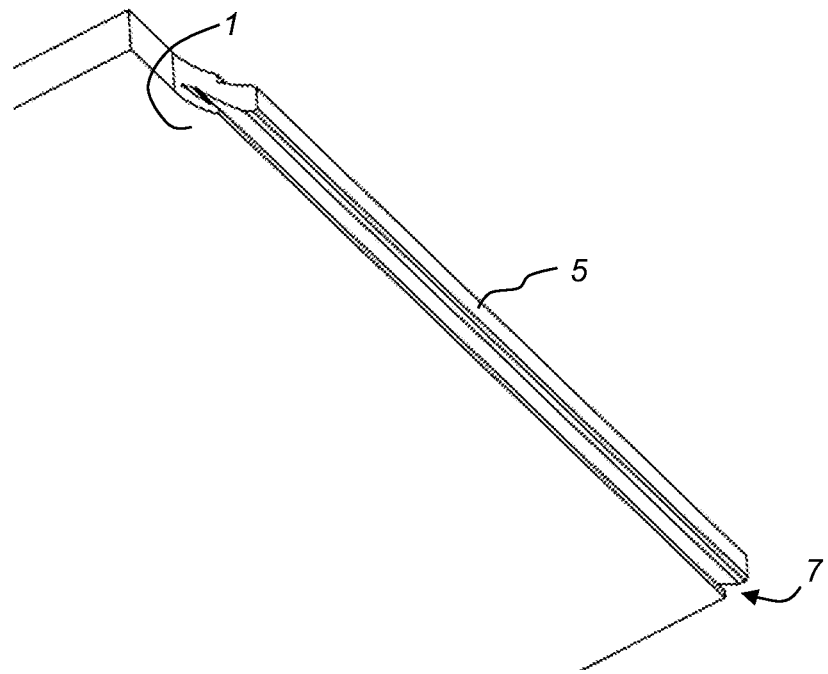
FIG. 6 is a partial perspective view of one part of the connection arrangement according to the present disclosure.
Figure 7:
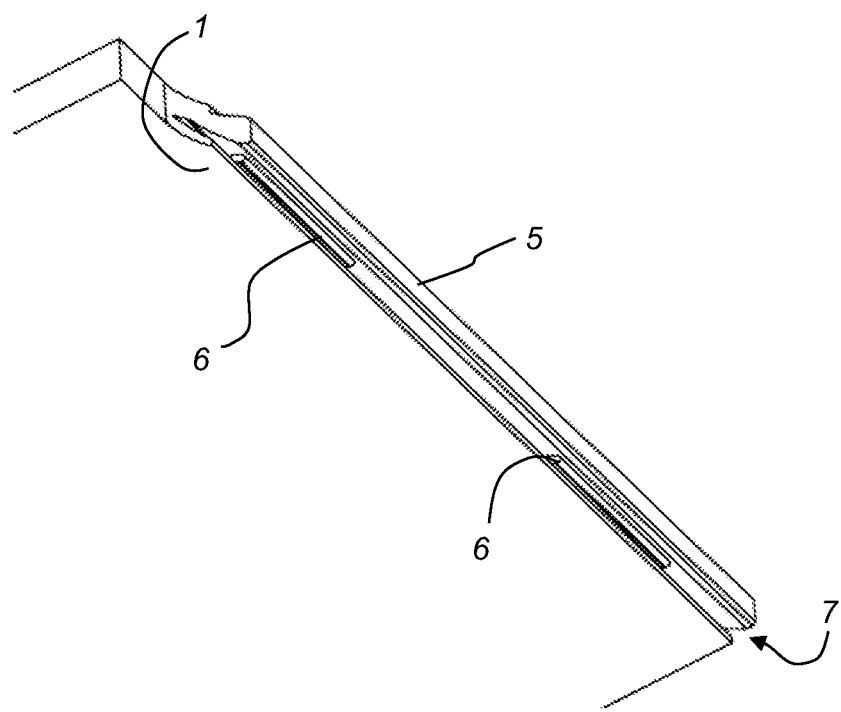
FIG. 7 is a partial perspective view of one part of the connection arrangement with flexible tongue elements according to the present disclosure.

FIGS. 6 and 7 are partial perspective views of shelves/first panels 1 seen from below showing first edge 5 of the first panel 1 and the elongate insertion groove 7. In FIG. 7 two elongate flexible tongue elements 6 have been inserted into the elongate insertion groove 7.

Figure 8:
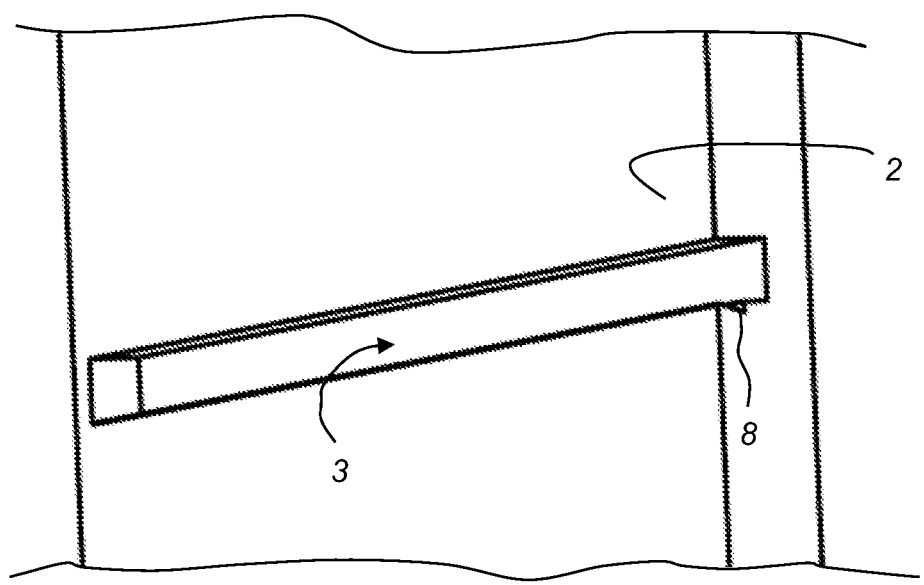
FIG. 8 is a partial perspective view of a further part of the connection arrangement according to the present disclosure.

Moving on to FIG. 8, a second panel 2 or upright panel is shown with a groove 3, corresponding to the edges of the first panels 1 shown in FIGS. 6 and 7. The groove 3 has an elongate tongue receiving groove 8 on the lower side of the groove 3 of the second panel 2. As shown in FIG. 8, the groove 3 may not extend for the entire width of the second panel 2. That is, the groove may be closed on one side edge, or on both side edges.

The first panel 1 and/or of the second panel 2 may be a wood-based panel, such as comprising a MDF, HDF, OSB, WPC, plywood, or particleboard.

The first panel 1 and/or of the second panel 2 may comprise a plastic material, such as thermosetting plastic or thermoplastic e.g., vinyl, PVC, PU or PET. The plastic material may comprise fillers.

The flexible tongue elements 6 may comprise a polymer material, such as a thermoplastic material, optionally with an enforcement, such as glass fibre.

Further embodiments are described below:

1. A connection arrangement for panels, comprising a first panel (1) having a first main plane (A), a second panel (2) having a second main plane (B), the first main plane (A) is essentially perpendicular to the second main plane (B) in a connected state, wherein the second panel (2) comprises a groove (3) on a first face (4) adapted to receive a first edge (5) of the first panel (1), the connection arrangement further comprising an elongate flexible tongue element (6) arranged in an elongate insertion groove (7) in the first panel (1) at an angle (α) relative the first main plane (A) and arranged to cooperate with an elongate tongue receiving groove (8) arranged in said groove (3) of the second panel (2) for connecting the two panels (1, 2) to one another, the elongate insertion groove (7) having a bottom surface (9) towards which the flexible tongue element (6) is arranged to be compressed during connection of the two panels (1, 2), wherein the elongate insertion groove (7) in the first panel (1) together with the elongate flexible tongue element (6) at said edge (5) of the first panel (1) are configured to extend through the plane of the first face (4) of the second panel (2) when the two panels (1, 2) are in a connected state.
2. The connection arrangement according to embodiment 1, wherein the elongate tongue receiving groove (8) is arranged adjacent an edge of said groove (3) on the first face (4) of the second panel (2).
3. The connection arrangement according to any of the preceding embodiments, wherein the edge (5) of the first panel (1) has an elongate tongue (10) and the groove (3) of the second panel (2) is adapted to receive said elongate tongue (10).
4. The connection arrangement according to any of the preceding embodiments, wherein the first panel (1) is to be horizontally arranged and the second panel (2) vertically arranged, wherein the elongate tongue receiving groove (8) is arranged on the lower side of the groove (3) in the second panel (2).
5. The connection arrangement according to any of the preceding embodiments, wherein the elongate tongue receiving groove (8) is arranged at an angle that is less than the angle (α) of the elongate insertion groove (7) relative said first main plane (A).
6. The connection arrangement according to any of the preceding embodiments, wherein the elongate insertion groove (7) is arranged at an angle (α) of less than 45° relative said first main plane (A).
7. The connection arrangement according to any of the preceding embodiments, wherein the elongate insertion groove (7) is arranged at an angle (α) of 30°+/−10°.
8. The connection arrangement according to any of the preceding embodiments, wherein the first panel (1) comprises a core (11) comprising fibres arranged essentially parallel to the first main plane (A).
9. The connection arrangement according to any of the preceding embodiments, wherein the panels (1, 2) have a surface layer (12) that is harder than their cores (11).
10. The connection arrangement according to any of the preceding embodiments, wherein the elongate flexible tongue element (6) is made of a material that is harder than the panel material.
11. The connection arrangement according to any of the preceding embodiments, wherein the first panel (1) is a shelf and the second panel (2) is an upright panel.
12. A connection arrangement for panels (1, 2), comprising a first panel (1) having a first main plane (A), a second panel (2) having a second main plane (B), the first main plane (A) is essentially perpendicular to the second main plane (B) in a connected state, wherein the second panel (2) comprises a groove (3) on a first face (4) adapted to receive a first edge (5) of the first panel (1), the connection arrangement further comprising an elongate flexible tongue element (6) arranged in an elongate insertion groove (7) in the first panel (1) at an angle (α) relative the first main plane (A) and arranged to cooperate with an elongate tongue receiving groove (8) arranged in said groove (3) of the second panel (2) for connecting the two panels (1, 2) to one another, the elongate insertion groove (7) having a bottom surface (9) towards which the flexible tongue element (6) is arranged to be compressed during connection of the two panels (1, 2), wherein the elongate insertion groove (7) is arranged at an angle (α) of less than 45° relative said first main plane (A).
13. The connection arrangement according to embodiment 12, wherein the elongate insertion groove (7) is at an angle (α) of 30°+/−10°.
14. The connection arrangement according to any of the embodiments 12 and 13, wherein the edge (5) of the first panel (1) has an elongate tongue (10) and the groove (3) of the second panel (3) is adapted to receive said tongue (10).
15. The connection arrangement according to any of the embodiments 12 to 14, wherein the elongate insertion groove (7) in the first panel (1) together with the elongate flexible tongue element (6) at said edge (5) of the first panel (1) are configured to extend through the plane of the first face (4) of the second panel (2) when the two panels (1, 2) are in a connected state.

16. The connection arrangement according to any of the embodiments 12 to 15, wherein the elongate tongue receiving groove (8) is arranged adjacent an edge of said groove (3) on the first face (4) of the second panel (2).

17. The connection arrangement according to any of the embodiments 12 to 16, wherein the first panel (1) is to be horizontally arranged and the second panel (2) vertically arranged, wherein the elongate tongue receiving groove (8) is arranged on the lower side of the groove (3) in the second panel (2).

18. The connection arrangement according to any of the embodiments 12 to 17, wherein the elongate tongue receiving groove (8) is arranged at an angle that is less than the angle ($\alpha$) of the elongate insertion groove (7) relative said first main plane (A).

19. The connection arrangement according to any of the embodiments 12 to 18, wherein the first panel (1) comprises a core (11) comprising fibres arranged essentially parallel to the first main plane (A).

20. The connection arrangement according to any of the embodiments 12 to 19, wherein the panels (1, 2) have a surface layer (12) that is harder than their cores (11).

21. The connection arrangement according to any of the embodiments 12 to 20, wherein the elongate flexible tongue element (6) is made of a material that is harder than the panel material.

22. The connection arrangement according to any of the embodiments 12 to 21, wherein the first panel (1) is a shelf and the second panel (2) is an upright panel.

23. A furniture product, such as a bookshelf or cabinet, comprising the connection arrangement for panels (1, 2) according to any of the embodiments 1 to 22.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teaching of the present invention is/are used.

The indefinite articles "a" and "an," as used herein in the specification and in the claims, unless clearly indicated to the contrary, should be understood to mean "at least one."

The invention claimed is:

1. A connection arrangement for panels, comprising a first panel having a first main plane, a second panel having a second main plane, the first main plane is perpendicular to the second main plane in a connected state,
    wherein the second panel comprises a groove on a first face adapted to receive a first edge of the first panel, the connection arrangement further comprising an elongate flexible tongue element arranged in an elongate insertion groove in the first panel at an angle relative to the first main plane and arranged to cooperate with an elongate tongue receiving groove arranged in said groove of the second panel for connecting the two panels to one another, the elongate insertion groove having a bottom surface towards which the flexible tongue element is arranged to be compressed during connection of the two panels,
    wherein the elongate insertion groove in the first panel together with the elongate flexible tongue element at said edge of the first panel are configured to extend through the plane of the first face of the second panel when the two panels are in a connected state, and
    wherein the elongate tongue receiving groove is arranged at an angle that is less than the angle of the elongate insertion groove relative to said first main plane.

2. The connection arrangement according to claim 1, wherein the elongate tongue receiving groove is arranged at an edge of said groove on the first face of the second panel.

3. The connection arrangement according to claim 1, wherein the edge of the first panel has an elongate tongue and the groove of the second panel is adapted to receive said elongate tongue.

4. The connection arrangement according to claim 1, wherein the first panel is configured to be horizontally arranged and the second panel vertically arranged, wherein the elongate tongue receiving groove is arranged on the lower side of the groove in the second panel.

5. The connection arrangement according to claim 1, wherein the elongate insertion groove is arranged at an angle relative to said first main plane, wherein the angle is in a range of about 10° to about 45°.

6. The connection arrangement according to claim 1, wherein the elongate insertion groove is arranged at an angle of 30°+/−10°.

7. The connection arrangement according to claim 1, wherein the first panel comprises a core comprising fibres arranged parallel to the first main plane.

8. The connection arrangement according to claim 1, wherein the panels have a surface layer that is harder than their cores.

9. The connection arrangement according to claim 1, wherein the elongate flexible tongue element is made of a material that is harder than the panel material.

10. The connection arrangement according to claim 1, wherein the first panel is a shelf and the second panel is an upright panel.

11. A connection arrangement for panels, comprising a first panel having a first main plane, a second panel having a second main plane, the first main plane is perpendicular to the second main plane in a connected state, wherein the second panel comprises a groove on a first face adapted to receive a first edge of the first panel, the connection arrangement further comprising an elongate flexible tongue element arranged in an elongate insertion groove in the first panel at an angle relative to the first main plane and arranged to cooperate with an elongate tongue receiving groove arranged in said groove of the second panel for connecting the two panels to one another, the elongate insertion groove having a bottom surface towards which the flexible tongue element is arranged to be compressed during connection of the two panels, and wherein the elongate insertion groove is arranged at an angle relative to said first main plane, wherein the angle (α) is in a range of 30°+/−10.

12. The connection arrangement according to claim 11, wherein the edge of the first panel has an elongate tongue and the groove of the second panel is adapted to receive said tongue.

13. The connection arrangement according to claim 11, wherein the elongate insertion groove in the first panel together with the elongate flexible tongue element at said edge of the first panel are configured to extend through the plane of the first face of the second panel when the two panels are in a connected state.

14. The connection arrangement according to claim 11, wherein the elongate tongue receiving groove is arranged at an edge of said groove on the first face of the second panel.

15. The connection arrangement according to claim 11, wherein the first panel is to be horizontally arranged and the second panel vertically arranged, wherein the elongate tongue receiving groove is arranged on the lower side of the groove in the second panel.

16. The connection arrangement according to claim 11, wherein the elongate tongue receiving groove is arranged at an angle that is less than the angle of the elongate insertion groove relative said first main plane.

17. The connection arrangement according to claim 11, wherein the first panel comprises a core comprising fibres arranged parallel to the first main plane.

18. The connection arrangement according to claim 11, wherein the panels have a surface layer that is harder than their cores.

19. The connection arrangement according to claim 11, wherein the elongate flexible tongue element is made of a material that is harder than the panel material.

20. The connection arrangement according to claim 11, wherein the first panel is a shelf and the second panel is an upright panel.

21. The connection arrangement according to claim 1, wherein the angle of the elongate tongue receiving groove relative to said first main plane is 5° to 20°.

22. The connection arrangement according to claim 11, wherein the angle of the elongate tongue receiving groove relative to said first main plane is 5° to 20°.

* * * * *

UNITED STATES PATENT AND TRADEMARK OFFICE
CERTIFICATE OF CORRECTION

| | |
|---|---|
| PATENT NO. | : 12,011,086 B2 |
| APPLICATION NO. | : 17/959010 |
| DATED | : June 18, 2024 |
| INVENTOR(S) | : Mindaugas Zacharenko |

It is certified that error appears in the above-identified patent and that said Letters Patent is hereby corrected as shown below:

In the Claims

Column 11, Lines 15-16, Claim 11:
""the angle ($\alpha$) is in a range""
Should read:
-- the angle is in a range --

Signed and Sealed this
Twentieth Day of August, 2024

Katherine Kelly Vidal
*Director of the United States Patent and Trademark Office*